(12) United States Patent
Chou

(10) Patent No.: US 7,556,077 B2
(45) Date of Patent: Jul. 7, 2009

(54) SPEED-CHANGE TRANSMISSION MECHANISM FOR LAMINATOR OR THE LIKE

(75) Inventor: Kuang-Hui Chou, Taipei Hsien (TW)

(73) Assignee: Tex Year Industries Inc., Taipei Hsien (TW)

( * ) Notice: Subject to any disclaimer, the term of this patent is extended or adjusted under 35 U.S.C. 154(b) by 405 days.

(21) Appl. No.: 11/646,303

(22) Filed: Dec. 28, 2006

(65) Prior Publication Data

US 2008/0156128 A1    Jul. 3, 2008

(51) Int. Cl.
*B32B 37/00* (2006.01)
(52) U.S. Cl. .................. 156/555; 156/582
(58) Field of Classification Search ........... 156/555, 156/580, 582, 583.1; 100/327, 328, 334, 100/155 R, 160, 176
See application file for complete search history.

(56) References Cited

U.S. PATENT DOCUMENTS

| | | | |
|---|---|---|---|
| 6,874,555 B1* | 4/2005 | Hsiao | 156/555 |
| 7,013,945 B2* | 3/2006 | Kim | 156/555 |
| 2006/0260758 A1* | 11/2006 | Kim | 156/555 |

* cited by examiner

*Primary Examiner*—James Sells
(74) *Attorney, Agent, or Firm*—Birch, Stewart, Kolasch & Birch, LLP

(57) ABSTRACT

A speed-change transmission mechanism used in a laminator is disclosed to include a plurality of driving gears rotatable with a transmission shaft by a power drive, a driven shaft for rotating two thermal-compression rolls through two meshed driven gears, a plurality of transmission gears respectively mounted on the driven shaft and meshed with the driving gears, and a switching device for selectively controlling rotation of the transmission gears with the driven shaft to further control the speed and torque of the driven shaft.

7 Claims, 7 Drawing Sheets

SPEED-CHANGE TRANSMISSION MECHANISM FOR LAMINATOR OR THE LIKE

BACKGROUND OF THE INVENTION

1. Field of the Invention

The present invention relates to a transmission mechanism and more particularly, to a speed-change transmission mechanism for use in a laminator or the like, which allows the user to change the torque and the transmission speed.

2. Description of the Related Art

A laminator is a mall office machine commonly used to laminate a card, photo, or leaf with laminating films. When a card, photo, or leaf is covered with two laminating films and inserted into a laminator, the two laminating films with the sandwiched card, photo or leaf are delivered through two thermal-compression rolls and then well sealed. The laminated item has a nice looking, and can be kept for a long period of time.

Different laminators from different suppliers may be designed for use with different laminating films having different thickness. When laminating relatively thicker laminating films, a relatively longer heating time is required, and a relatively greater driving force is necessary to transfer the laminating films through the thermal-compression rolls. On the contrary, when transferring relatively thinner laminating films through the thermal-compression rolls, the transferring speed must be relatively accelerated, preventing deformation of the laminating films. To fit different laminating films of different thickness, a laminator must use a speed changeable transmission mechanism.

The speed control of the transmission mechanism of a conventional laminator is an electronic design. By means of switching on a control button to obtain a relatively greater current, the thermal-compression rolls of the laminator are rotated at a relatively higher speed, thereby providing a relatively higher speed ratio to have the relatively thicker laminating films with the sandwiched item be transferred through the two thermal-compression rolls. Using a relatively greater current to drive the thermal-compression rolls can overcome the resistance produced upon insertion of the thick laminating films with the sandwiched item through the gap between the two thermal-compression rolls. However, because the thermal-compression rolls are rotated at a high speed upon application of the relatively greater current, the thick laminating films with the sandwiched item are moved through the gap between the thermal-compression rolls fast, resulting in incomplete lamination of the laminating films. Further, the use of a relatively greater current causes a relatively greater thermal noise. On the contrary, when transferring laminating films with sandwiched item through the gap between the two thermal-compression rolls at a low speed, the heating time is relatively extended, however the power may be insufficient to transfer the laminating films with the sandwiched item smoothly through the gap between two thermal-compression rolls. At this time, the laminating films with the sandwiched item may be biased.

Therefore, it is preferably to use a mechanical transmission mechanism for laminator. A mechanical transmission mechanism can provide a high torque with a low transmission speed and without thermal noise when transferring relatively thicker laminating films. When transferring relatively thinner laminating films, a mechanical transmission mechanism can be operated at a low torque and high transmission speed mode.

SUMMARY OF THE INVENTION

The present invention has been accomplished under the circumstances in view. It is the main object of the present invention to provide a speed-change transmission mechanism for use in a laminator or the like, which provides two gear sets that allow the user to change their engagement status for different speed transmission, such that when at a low speed, the torque is stable and relatively greater for thick film lamination and, when at a high speed, the torque is still stable for safety transmission without thermal noise.

To achieve this and other objects of the present invention, the speed-change transmission mechanism comprises a power drive; a transmission shaft coupled to and rotatable by the power drive; two thermal-compression rolls arranged in parallel; a plurality of driving gears respectively fixedly mounted on the transmission shaft for rotation with the transmission shaft, the driving gears including a master driving gear and at least one supplementary driving gear; a first driven gear fixedly mounted on one end of one of the thermal-compression rolls; a driven shaft fixedly connected to one side of the driven gear for rotating the driven gear, the driven shaft having at least one longitudinal key groove; a master transmission gear mounted on and movable along the driven shaft and meshed with the master driving gear, the master transmission gear having at least one key engaged into the at least one longitudinal key groove of the driven shaft for allowing rotation of the master transmission gear with the driven shaft and axial movement of the master transmission gear relative to the driven shaft and at least one plug; at least one supplementary transmission gear respectively sleeved onto the driven shaft and rotatable relative to the driven shaft and respectively meshed with the at least one supplementary driving gear, the at least one supplementary transmission gear each having at least one retaining notch for receiving the at least one plug of the master transmission gear; and a switching device adapted to move the master transmission gear along the driven shaft and to further force the at least one plug of the master transmission gear into engagement with the at least one retaining notch of one of the at least one supplementary transmission gear for enabling the respective supplementary transmission gear to be rotated with the master transmission gear when the master transmission gear is kept meshed with the master driving gear.

DETAILED DESCRIPTION OF THE INVENTION

Figure 1:
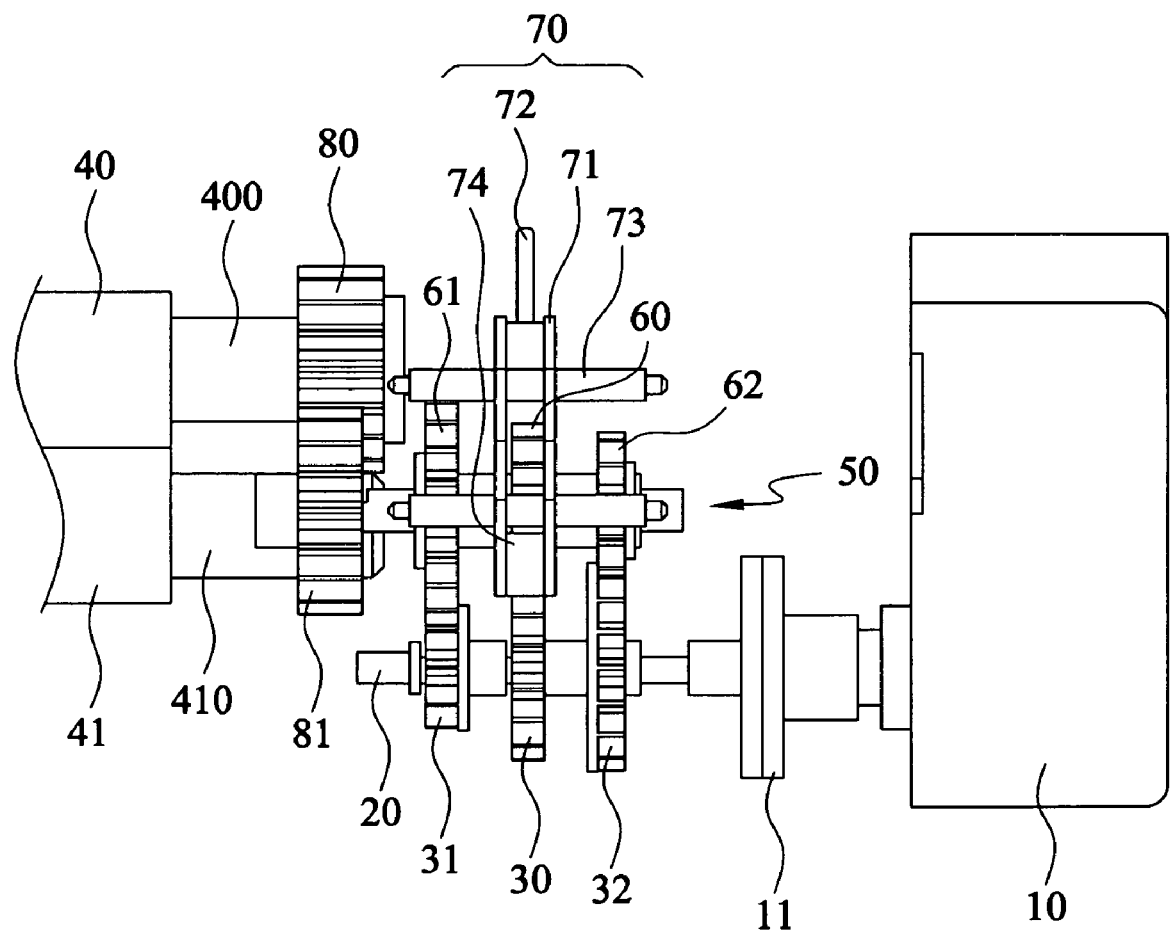
FIG. 1 is a schematic side view of a speed-change transmission mechanism according to the present invention.

Referring to FIG. 1, a speed-change transmission mechanism in accordance with the present invention is adapted for use in a small office machine, for example, laminator or the like, comprising a power drive 10. The power drive 10 can be, for example, a motor. A transmission shaft 20 is coupled to the power drive 10 by a coupling 11. A plurality of driving gears, namely, the intermediate driving gear 30, the front driving gear 31 and the rear driving gear 32 are respectively affixed to the transmission shaft 20. These driving gears 30, 31 and 32 have different sizes for different transmission purposes.

Figure 2:
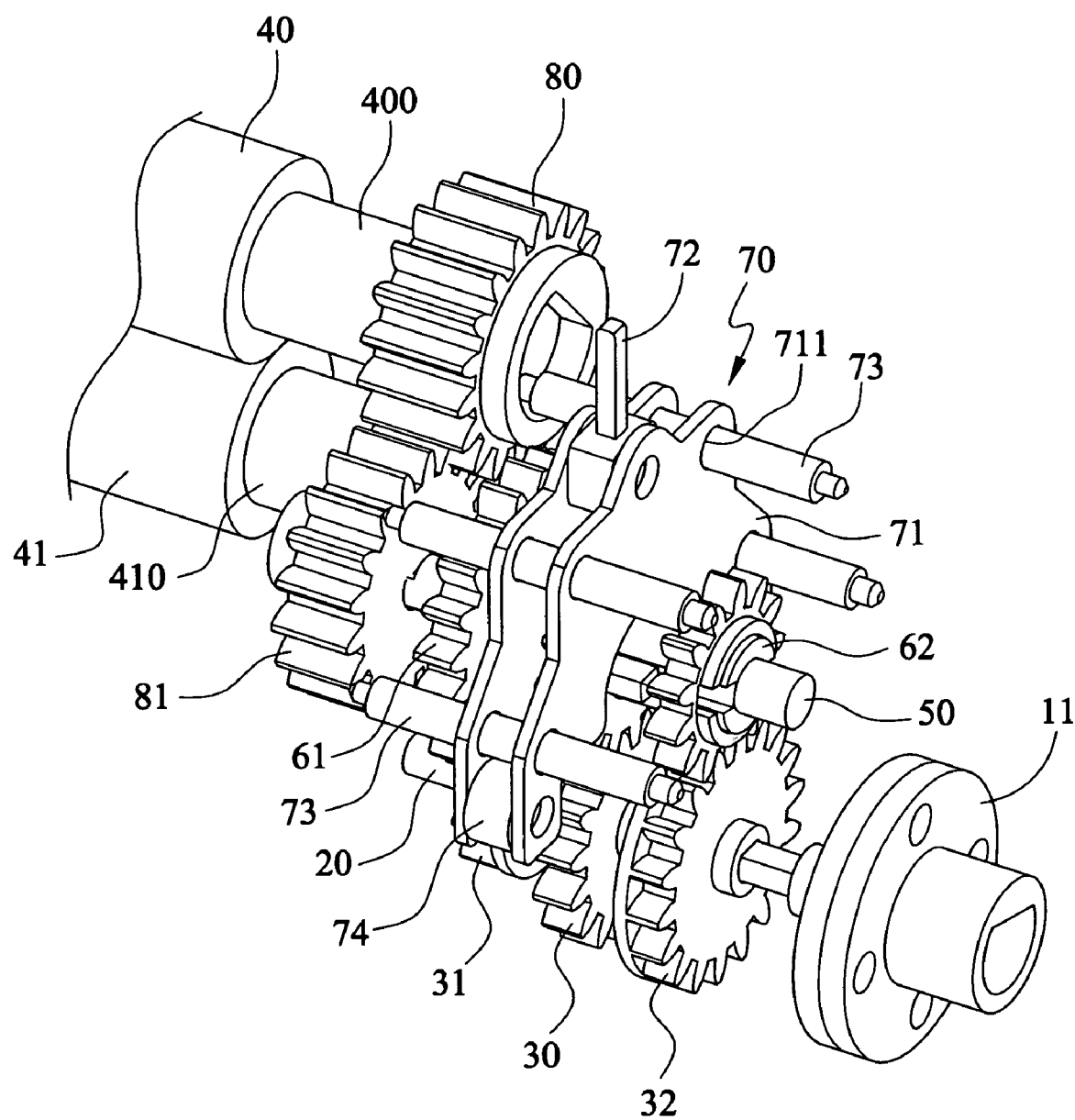
FIG. 2 is an enlarged view of a part of FIG. 1.
Figure 3:
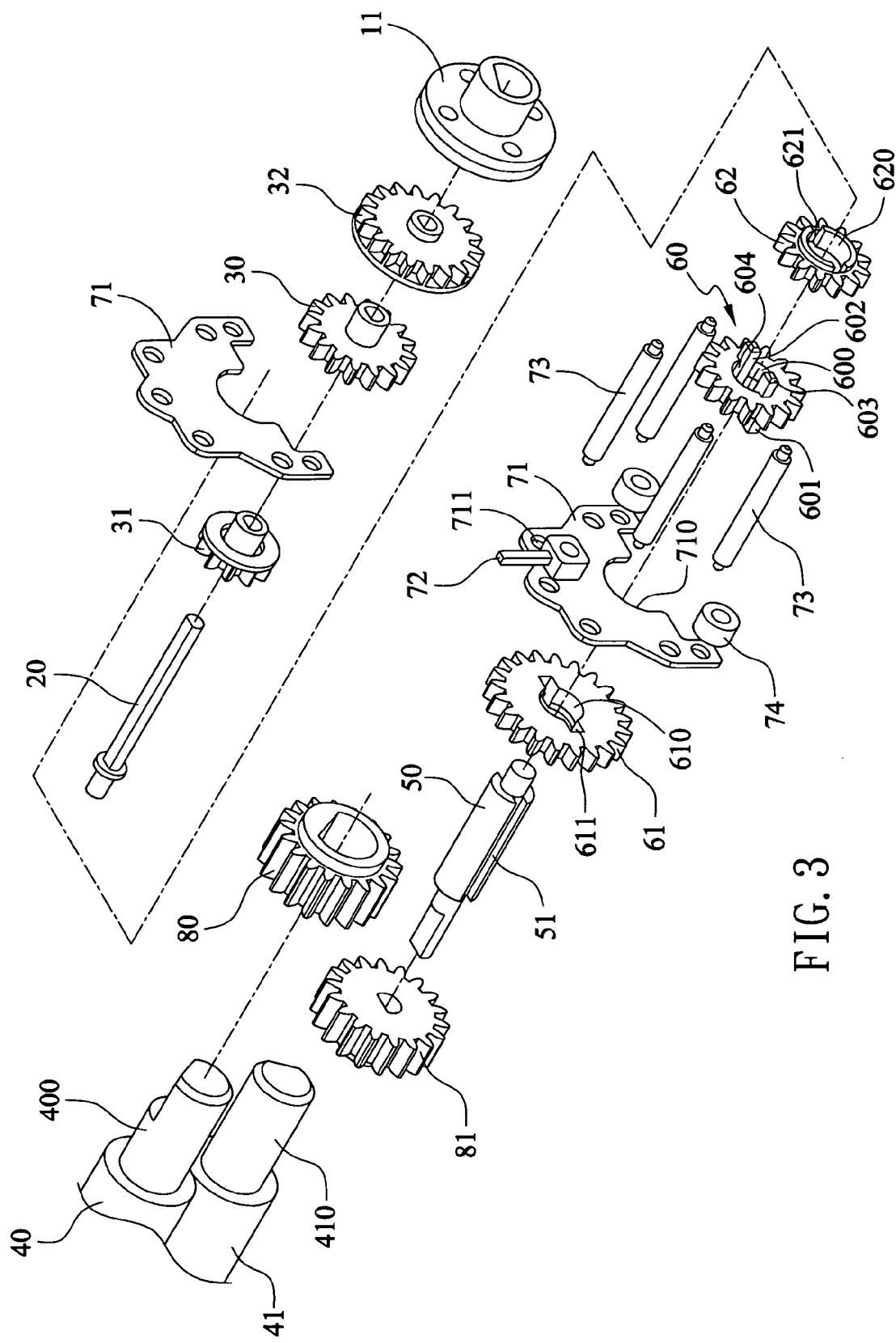
FIG. 3 is an exploded view of FIG. 2.

The speed-change transmission mechanism further comprises two thermal-compression rolls 40 and 41 arranged in parallel. The thermal-compression rolls 40 and 41 each have an axle 400 or 410 and a driven gear 80 or 81 fixedly mounted on the axle 400 or 410. The driven gears 80 and 81 are meshed together so that the two thermal-compression rolls 40 and 41 can be synchronously operated. A driven shaft 50 is axially connected to the driven gear 81 at the axle 410 of one thermal-compression roll 41. The driven shaft 50 carries an intermediate transmission gear 60, a front transmission gear 61, and a rear transmission gear 62. Referring also to FIGS. 2 and 3, the driven shaft 50 has two longitudinal key grooves 51 symmetrically disposed at two sides. The intermediate transmission gear 60 has a center axle hole 600 for the passing of the driven shaft 50, two pairs of plugs 601 and 602 symmetrically arranged at two sides, and two keys 604 respectively radially protruded from the plugs 601 and 602 and respectively engaged into the longitudinal key grooves 51 of the driven shaft 50 for allowing rotation of the intermediate transmission gear 60 with the driven shaft 50. The plugs 601 and 602 each have the respective outer end terminating in a chamfer 603.

The front transmission gear 61 and the rear transmission gear 62 each have a center axle hole 610 or 620 and two retaining notches 611 or 621 in the center axle hole 610 or 620 at two sides. By means of the center axle holes 610 and 620, the front transmission gear 61 and the rear transmission gear 62 are respectively mounted on the driven shaft 50 at two sides relative to the intermediate transmission gear 60. However, the front transmission gear 61 and the rear transmission gear 62 are not rotatable with the driven shaft 50.

Figure 4:
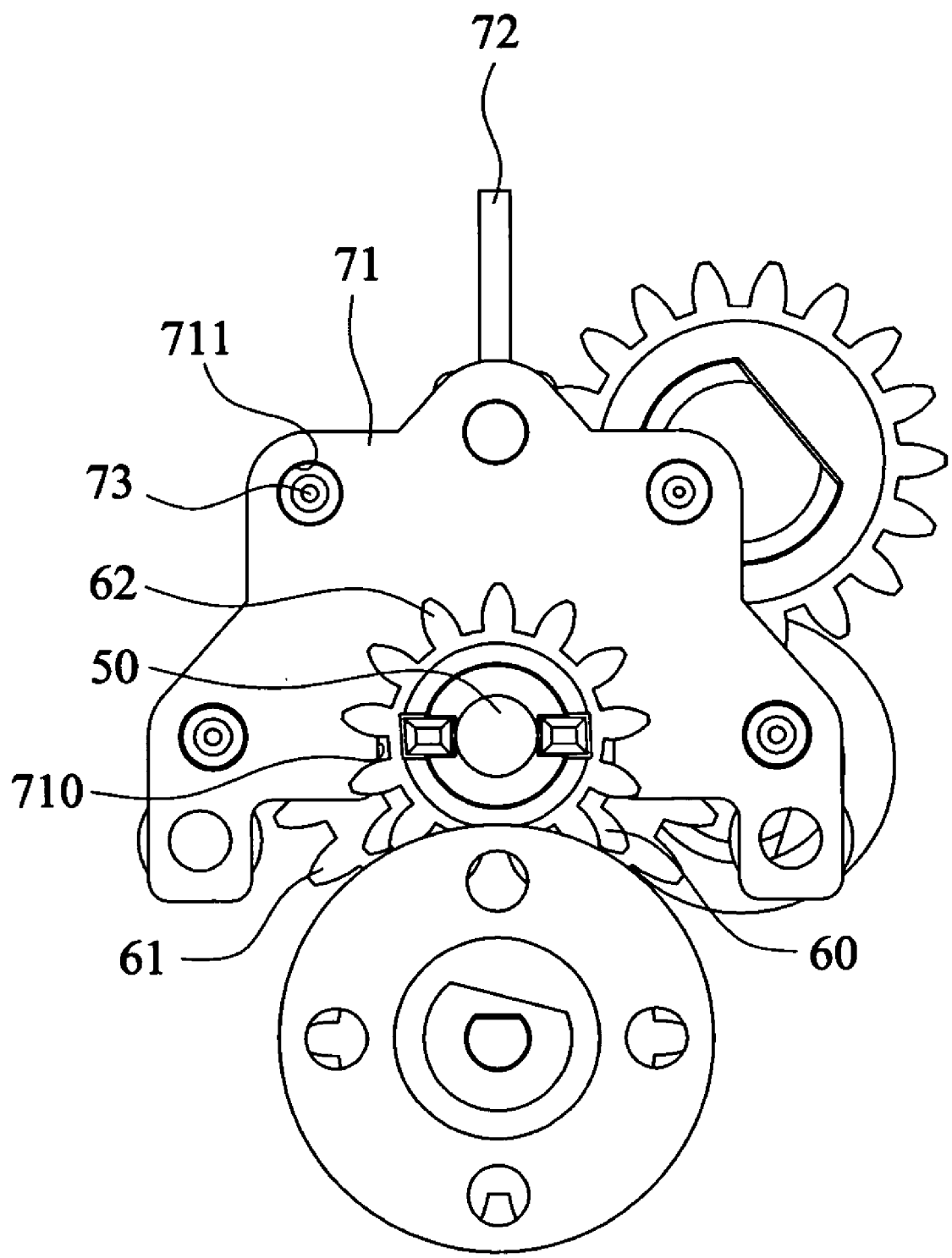
FIG. 4 is an end view of FIG. 2.

As shown in FIG. 1, the speed-change transmission mechanism further comprises a switching device 70 adapted to move the intermediate transmission gear 60 along the driven shaft 50. As shown in FIGS. 2 and 4, the switching device 70 comprises two support frames 71, a handle 72, a plurality of guide rails 73, and a plurality of spacer blocks 74. Each support frame 71 has a semicircular bottom opening 710 and a plurality of through holes 711 equiangularly spaced around the semicircular bottom opening 710. The diameter of the semicircular bottom opening 710 is greater than the distance between the two longitudinal blocks 601 and 602 of the intermediate transmission gear 60 at the driven shaft 50 but smaller than the wheel diameter of the intermediate transmission gear 60. The guide rails 73 are inserted through the through holes 711 of the support frames 71, holding the support frames 71 in parallel. The spacer blocks 74 are sandwiched between the support frames 71 to keep the support frames 71 apart. The handle 72 is affixed to the support frames 71. The user can operate the handle 72 to shift the switching device 70.

Figure 5:
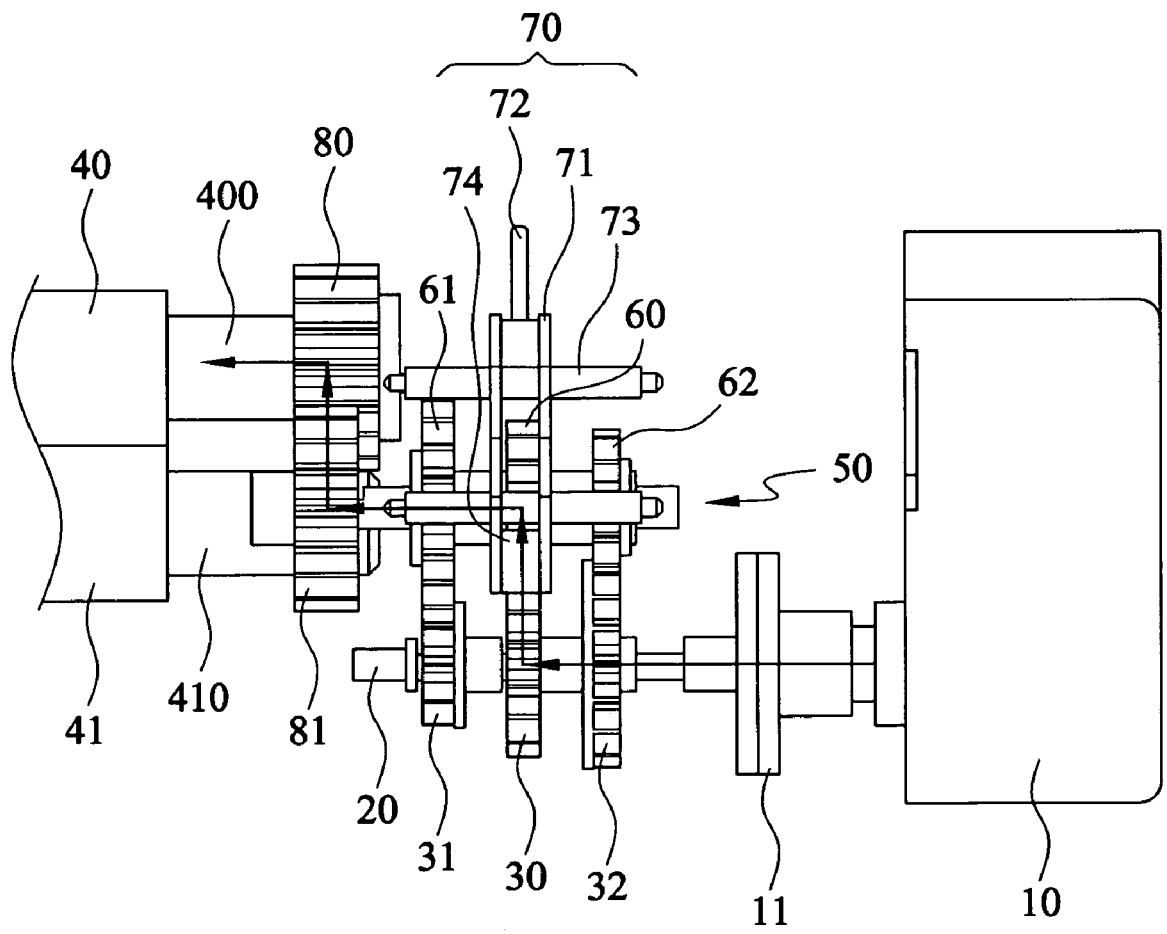
FIG. 5 is a schematic drawing showing the speed-change transmission mechanism in operation at a medium speed.

Referring to FIG. 5, when the intermediate transmission gear 60 at the driven shaft 50 is shifted into engagement with the intermediate driving gear 30 at the transmission shaft 20, the front transmission gear 61 and the rear transmission gear 62 are respectively forced into engagement with the front driving gear 31 and the rear driving gear 32 respectively. Because the front transmission gear 61 and the rear transmission gear 62 are not rotatable with the driven shaft 50, the front transmission gear 61 and the rear transmission gear 62 run idle during rotation of the intermediate transmission gear 60. At this time, the rotary driving power of the transmission shaft 20 is transferred to the intermediate transmission gear 60 and the driven shaft 50 to rotate the thermal-compression rolls 40 and 41. The speed-change transmission mechanism is at medium speed at this time.

Figure 6:
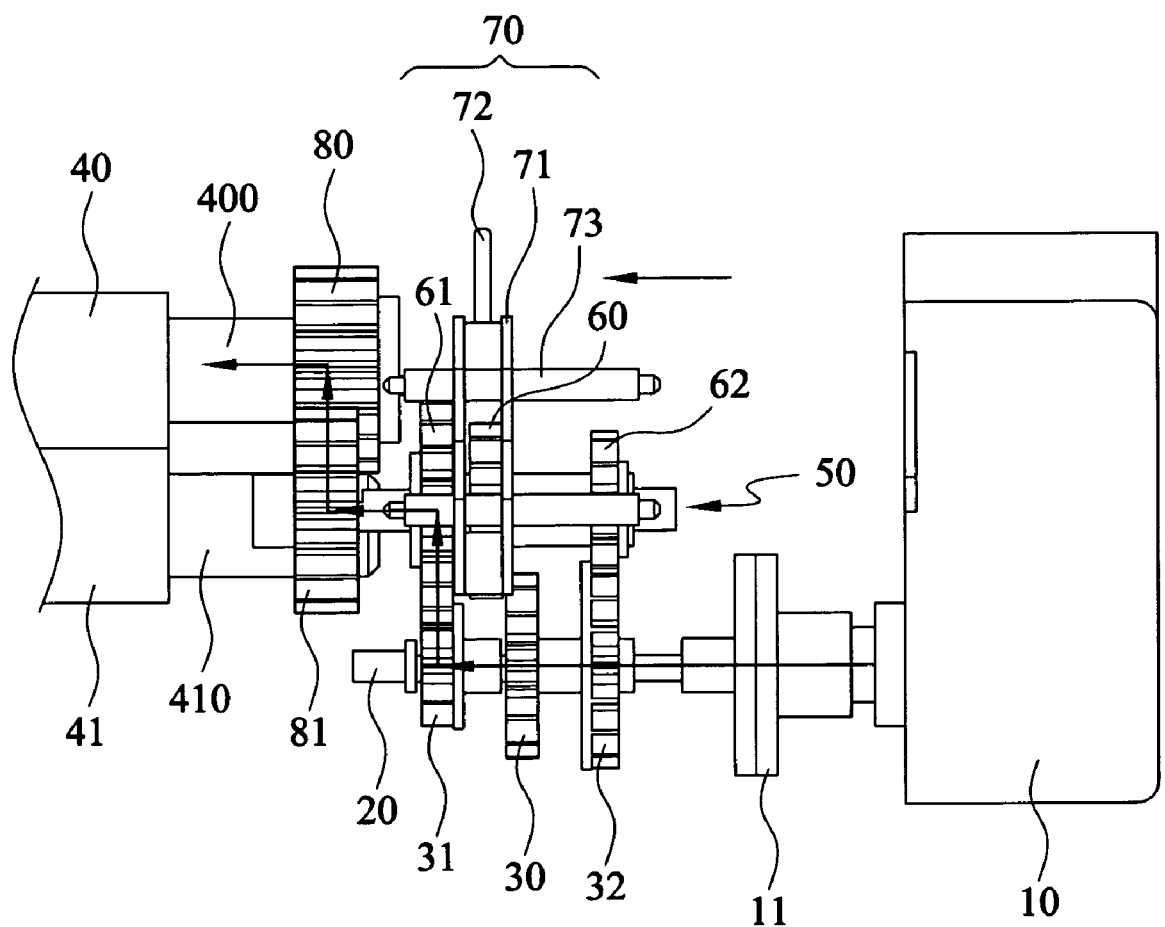
FIG. 6 is a schematic drawing showing the speed-change transmission mechanism in operation at a low speed.
Figure 7:
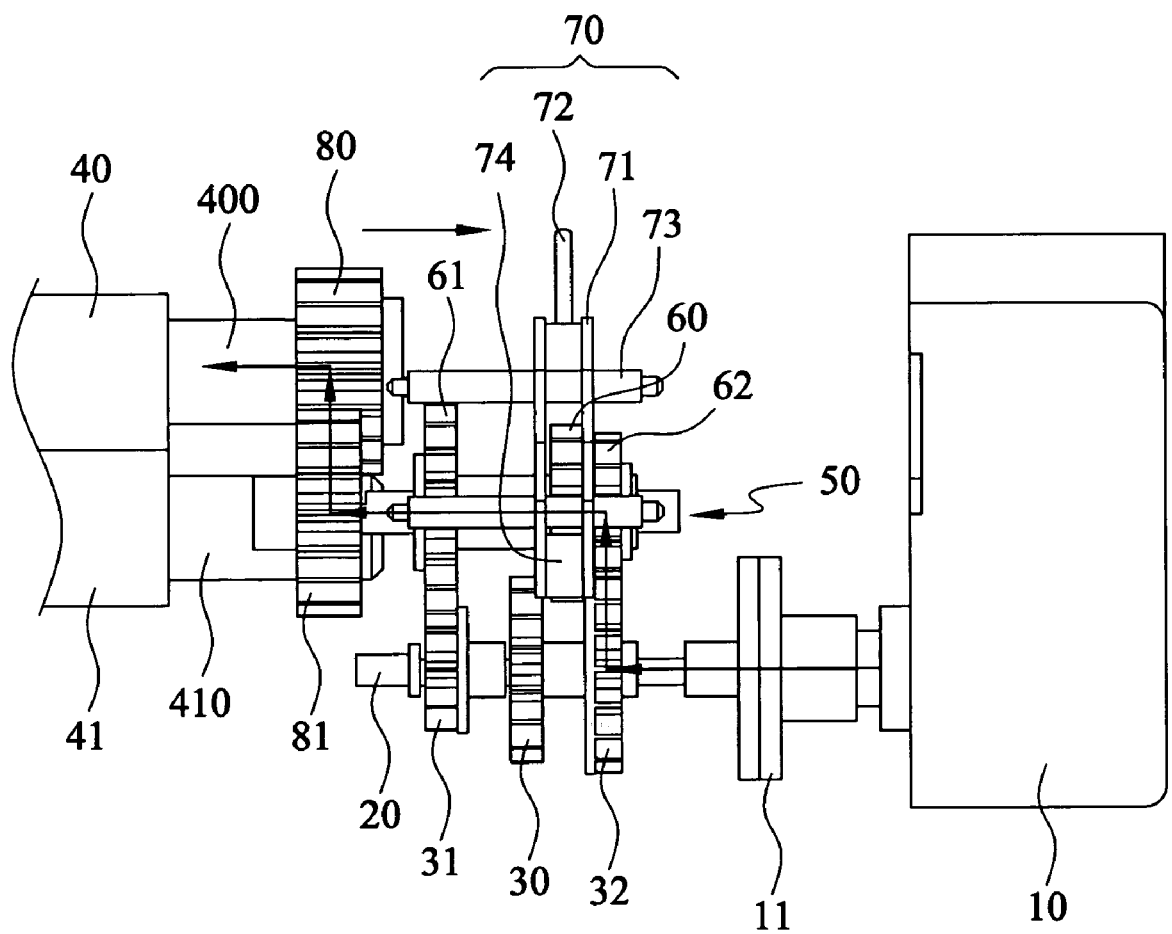
FIG. 7 is a schematic drawing showing the speed-change transmission mechanism in operation at a high speed.

Referring to FIG. 6, when operating the handle 72 to shift the switching device 70 leftwards, the plugs 601 at one side of the intermediate transmission gear 60 are engaged into the retaining notches 611 of the front transmission gear 61 for allowing rotation of the front transmission gear 61 with the intermediate transmission gear 60 and the driven shaft 50 upon rotation of the transmission shaft 20, thereby providing a second transmission speed (low transmission speed) to the thermal-compression rolls 40 and 41. One the contrary, as shown in FIG. 7, when operating the handle 72 to shift the switching device 70 rightwards, the plugs 602 at the other side of the intermediate transmission gear 60 are engaged into the retaining notches 621 of the rear transmission gear 62 for allowing rotation of the rear transmission gear 62 with the intermediate transmission gear 60 and the driven shaft 50 upon rotation of the transmission shaft 20, thereby providing a third transmission speed (high transmission speed) to the thermal-compression rolls 40 and 41.

As indicated above, the invention provides a speed-change transmission mechanism, which has the following features:

1. The speed-change transmission mechanism is a mechanical transmission mechanism that provides two gear sets. By means of changing the engagement status between the two gear sets, the speed-change transmission mechanism is controlled for different speed transmission. When at a low speed, the torque is stable and relatively greater for thick film lamination. When at a high speed, the torque is still stable for safety transmission without thermal noise.

2. By means of shifting the switching device manually to move the intermediate gear forwards/backwards (leftwards/rightwards) on the driven shaft, the desired transmission speed is controlled. This speed change operation is simple without extra electronic component parts or power supply, thereby saving much electric energy.

Although particular embodiment of the inventions have been described in detail for purposes of illustration, various modifications and enhancements may be made without departing from the spirit and scope of the invention. Accordingly, the invention is not to be limited except as by the appended claims.

What is claimed is:

1. A speed-change transmission mechanism comprising:

a power drive;

a transmission shaft coupled to and rotatable by said power drive;

two thermal-compression rolls arranged in parallel;

a plurality of driving gears respectively fixedly mounted on said transmission shaft for rotation with said transmission shaft, said driving gears including a master driving gear and at least one supplementary driving gear;

a first driven gear fixedly mounted on one end of one of said thermal-compression rolls;

a driven shaft fixedly connected to one side of said driven gear for rotating said driven gear, said driven shaft having at least one longitudinal key groove;

a master transmission gear mounted on and movable along said driven shaft and meshed with said master driving gear, said master transmission gear having at least one key engaged into said at least one longitudinal key groove of said driven shaft for allowing rotation of said master transmission gear with said driven shaft and axial movement of said master transmission gear relative to said driven shaft and at least one plug;

at least one supplementary transmission gear respectively sleeved onto said driven shaft and rotatable relative to said driven shaft and respectively meshed with said at least one supplementary driving gear, said at least one supplementary transmission gear each having at least one retaining notch for receiving the at least one plug of said master transmission gear; and a switching device adapted to move said master transmission gear along said driven shaft and to further force the at least one plug of said master transmission gear into engagement with the at least one retaining notch of one of said at least one supplementary transmission gear for enabling the respective supplementary transmission gear to be rotated with said master transmission gear when said master transmission gear is kept meshed with said master driving gear.

2. The speed-change transmission mechanism as claimed in claim 1, wherein said speed-change transmission mechanism has a handle for operating by the user.

3. The speed-change transmission mechanism as claimed in claim 1, further comprising a second driven gear fixedly mounted on one end of the other one of said thermal-compression rolls and meshed with said first driven gear.

4. The speed-change transmission mechanism as claimed in claim 1, wherein said switching device comprises two support frames arranged in parallel, said support frames each having a semicircular bottom opening for the passing of said at least one plug of said master transmission gear and a plurality of through holes equiangularly spaced around said semicircular bottom opening, said semicircular bottom opening having a diameter smaller than the wheel diameter of said master transmission gear, a plurality of guide rails inserted through the through holes of said support frames to hold said support frames in parallel, and a plurality of spacer blocks sandwiched between said support frames, and an operating handle affixed to said support frames.

5. A speed-change transmission mechanism comprising:
a power drive;
a transmission shaft coupled to and rotatable by said power drive;
two thermal-compression rolls arranged in parallel;
a plurality of driving gears respectively fixedly mounted on said transmission shaft for rotation with said transmission shaft, said driving gears having different sizes and including an intermediate driving gear, a front driving gear spaced from said intermediate driving gear at one side, and a rear driving gear spaced from said intermediate driving gear at one side opposite to said front driving gear;
a first driven gear fixedly mounted on one end of one of said thermal-compression rolls;

a driven shaft fixedly connected to one side of said driven gear for rotating said driven gear, said driven shaft having at least one longitudinal key groove;

an intermediate transmission gear mounted on and movable along said driven shaft and meshed with said intermediate driving gear, said intermediate transmission gear having at least one key and a plurality of plugs, said at least one key being engaged into said at least one longitudinal key groove of said driven shaft for allowing rotation of said intermediate transmission gear with said driven shaft and axial movement of said intermediate transmission gear relative to said driven shaft;

a front transmission gear and a rear transmission gear respectively sleeved onto said driven shaft at two opposite sides relative to said intermediate transmission gear and rotatable relative to said driven shaft and respectively meshed with said front driving gear and said rear driving gear, said front transmission gear and said rear transmission gear each having at least one retaining notch for receiving at least one of the plugs of said intermediate transmission gear; and a switching device adapted to move said intermediate transmission gear along said driven shaft selectively forwards/backwards and to further force at least one of the plugs of said intermediate transmission gear into engagement with the at least one retaining notch of one of said front transmission gear and said rear transmission gear for enabling one of said front transmission gear and said rear transmission gear to be rotated with said intermediate transmission gear when said intermediate transmission gear is kept meshed with said intermediate driving gear, said switching device comprising two support frames arranged in parallel, said support frames each having a semicircular bottom opening for the passing of said plugs of said intermediate transmission gear and a plurality of through holes equiangularly spaced around said semicircular bottom opening, said semicircular bottom opening having a diameter smaller than the wheel diameter of said master transmission gear, a plurality of guide rails inserted through the through holes of said support frames to hold said support frames in parallel.

6. The speed-change transmission mechanism as claimed in claim 5, wherein said switching device further comprises a plurality of spacer blocks sandwiched between said support frames.

7. The speed-change transmission mechanism as claimed in claim 5, wherein said switching device further comprises an operating handle affixed to said support frames.

* * * * *